United States Patent [19]

Shiber

[11] 3,753,478

[45] Aug. 21, 1973

[54] CLUTCH WITH FLUID OPERATED LOCK

[75] Inventor: Samuel Shiber, Chicago, Ill.

[73] Assignee: Borg-Warner Corporation, Chicago, Ill.

[22] Filed: July 19, 1971

[21] Appl. No.: 163,681

[52] U.S. Cl. .......... 192/85 AA, 192/86, 192/114 R, 92/24, 188/67
[51] Int. Cl. .......................................... F16d 25/063
[58] Field of Search .............. 192/85 AA, 86, 114 R

[56] References Cited
UNITED STATES PATENTS

| 2,180,154 | 11/1939 | Lenz | 192/114 X |
|---|---|---|---|
| 2,550,373 | 4/1951 | Ortloff et al. | 192/86 |
| 2,511,520 | 6/1950 | Walton | 192/85 AA |
| 3,105,578 | 10/1963 | Meyer | 192/86 X |
| 3,306,407 | 2/1967 | Smirl | 192/85 AA |

Primary Examiner—Benjamin W. Wyche
Attorney—Donald W. Banner

[57] ABSTRACT

A clutch mechanism for coupling a first shaft to a second shaft comprising a friction plate which is connected to one shaft and a clutch housing, a pressure plate that is connected to the second shaft, a pressure actuated cylinder and piston assembly for urging the pressure plate against the clutch housing, locking the friction plate there-in-between, and a mechanical means to maintain the pressure plate and housing in this position.

5 Claims, 2 Drawing Figures

Inventor
Samuel Shiber
By F. A. [signature]

Atty.

Inventor
Samuel Shiber

CLUTCH WITH FLUID OPERATED LOCK

SUMMARY

The present invention relates to a clutch which is engageable by a pressurized fluid that is applied to it for a relatively short time, and which may also be disengaged by pressurized fluid applied to it for a relatively short time.

Generally speaking, clutches that are engageable by pressurized fluid are well-known in the art. However, most designs call for the pressurized fluid to be supplied as long as the clutch is to be engaged.

Often the sensitive point in these designs is the rotary connection between the stationary air pressure supply to the rotary clutch. This is so especially where the pressurized fluid is dry air. Specifically, the sealing members in the rotary connection tend to wear when the pressure is applied through the rotary connection for a long period of time.

Therefore, it is one object of the invention to provide a clutch, engageable by fluid pressure which is maintained for a short time. Said clutch is to remain engaged after fluid pressure is stopped, until another pressure pulse is applied to it in order to release it. By pressure pulse, it is meant a pressurized air supply which is maintained for a short period of time.

DETAILED DESCRIPTION OF THE DRAWING

Figure 1:
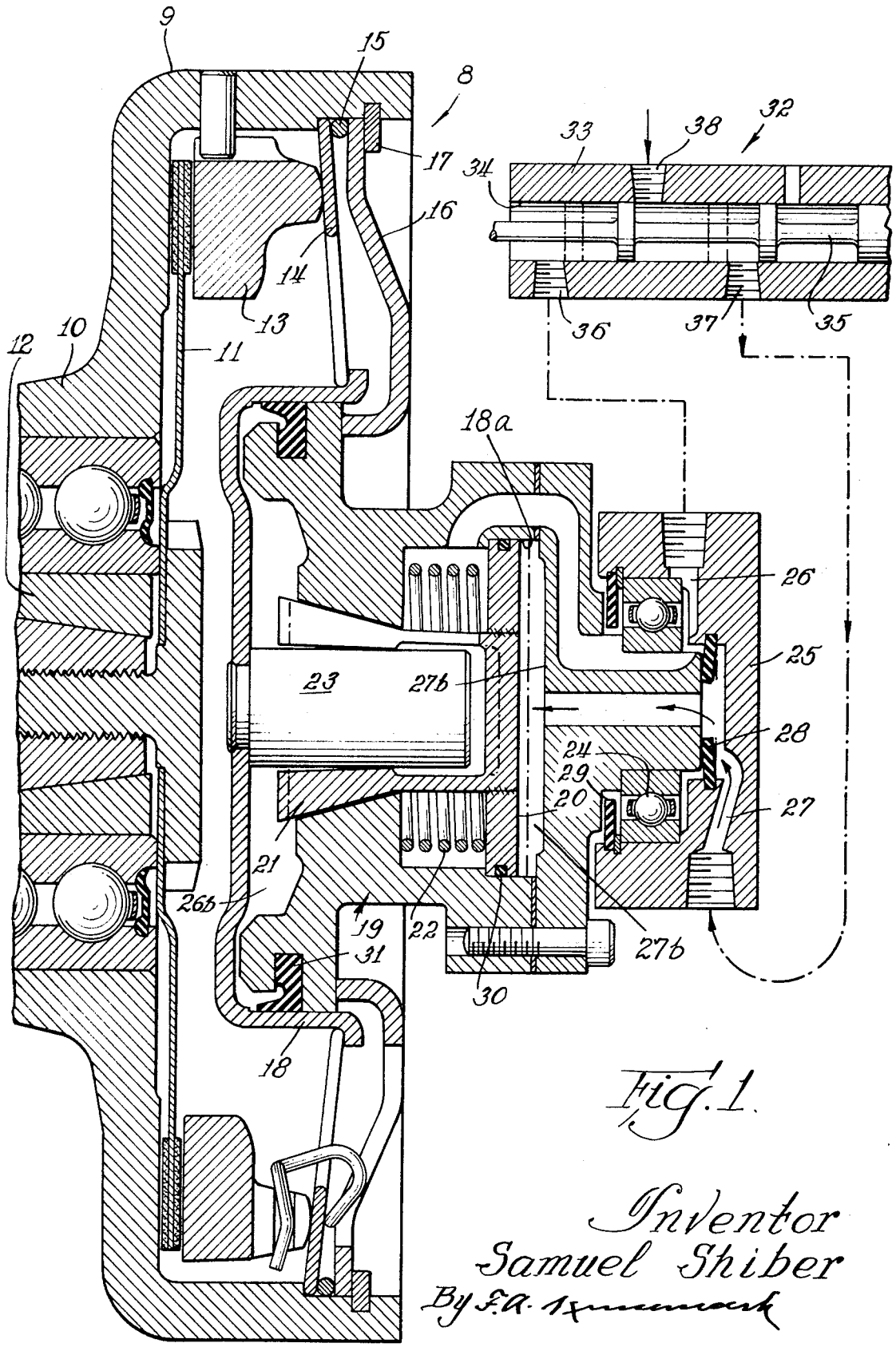
FIG. 1 shows a cross-sectional view of a clutch, according to the present invention in a disengaged position.

FIG. 1 shows an embodiment of a clutch 8 according to the present invention, comprising a clutch housing 9 anchored to a first shaft 10. A friction plate 11 is anchored to a second shaft 12, and a pressure plate 13 is anchored to the clutch housing 9.

A lever 14 is pivoted on a wire ring 15 that is backed by a cover 16 which in turn is secured to the housing 9 by a snap ring 17.

The lever 14 is actuatable by cylinder 18 which contains a piston 19. The piston 19 contains a release piston 20 and a collet 21 which are mechanically connected one to the other, and are urged rightwards by a compression spring 22, causing the collet 21 in a cylinder 18-a to lock on rod 23 which is connected to the cylinder 18. The piston 19 carries a ball bearing 24 which carries a housing 25.

The housing 25 defines a first passage 26 which continues through the piston 19 into a chamber 26-b, and a second passage 27 which continues through the piston 19 into a chamber 27-b. Numerals 28 and 29 indicate face seals, and numerals 30 and 31 indicate seals.

A control valve unit 32 comprises a housing 33, having a bore 34 therein, in which a spool 35 is operable. Discharge ports 36 and 37 and an inlet port 38 are communicable with the bore 34. The control valve unit 32 is operated either manually or by a control unit (neither shown).

OPERATION

Figure 2:
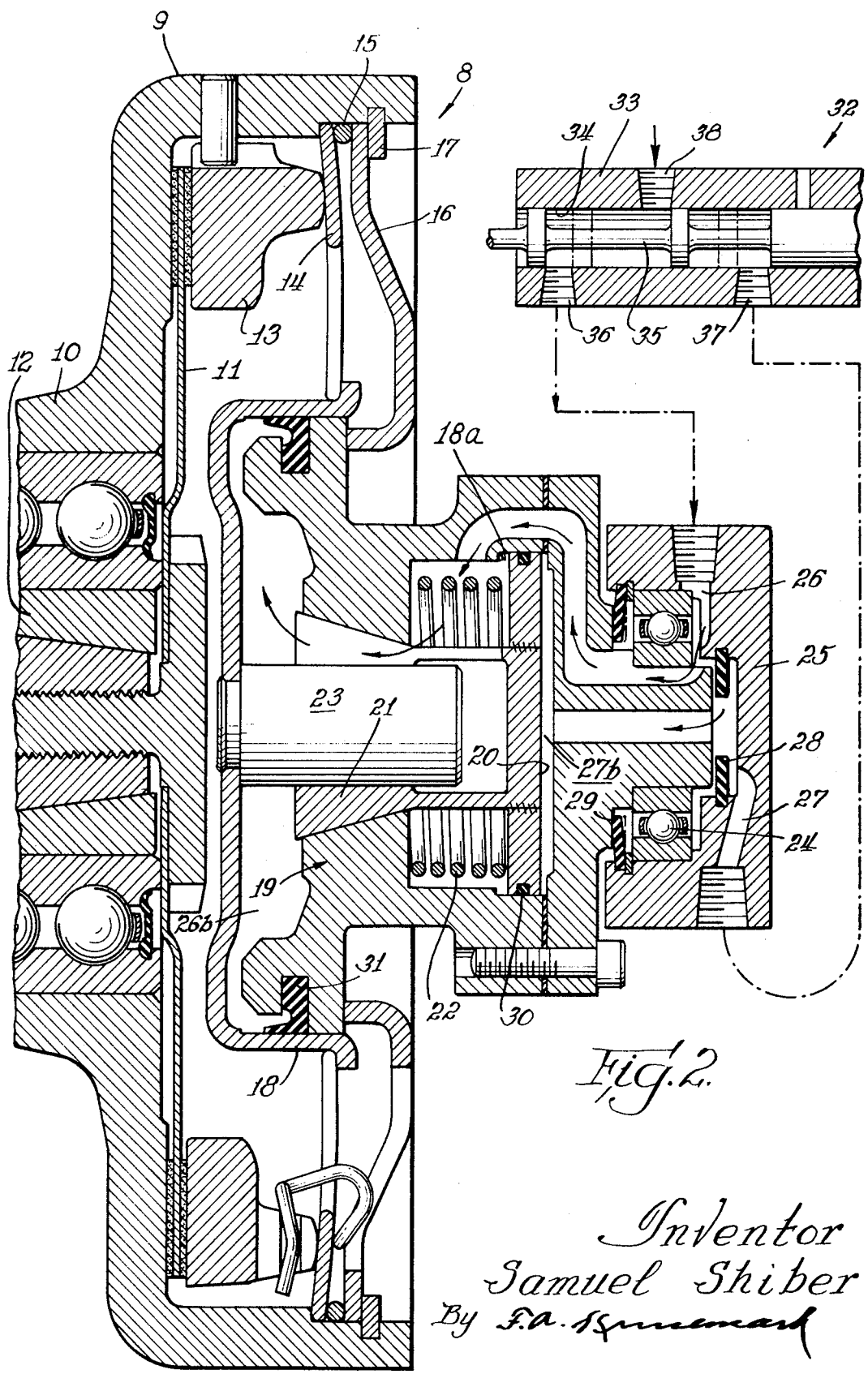
FIG. 2 shows a cross-sectional view of a clutch, according to the present invention in an engaged position.

When spool 35 is slid leftwards, the discharge port 36 is connected to the inlet port 38 as shown in FIG. 2, supplying first passage 26 with pressure which is passed to chamber 26-b, and to chamber 27-b. The face seal 29 becomes energized by this pressure, and the face seal 28 is de-energized. The pressure in chamber 26-b causes the cylinder 18 to lock the friction plate 11 between the clutch housing 9 and the pressure plate 13 by means of the lever 14 which is in contact with the pressure plate 13. Simultaneously the rod 23 is pulled out of the collet 21. After a short time, the spool 35 is returned to a neutral position, (shown in phantom line in FIGS. 1 and 2) venting the chambers 26-b and 27-b, however, at this stage the cylinder 18 cannot retract to its original position, due to the fact that collet 21 is wedged and locked on rod 23 in its new position, thus the clutch 8 remains engaged. The lever 14 has two additional functions. First it acts as a return spring, and second it acts as a spring means that assures that the clutch 8 will remain engaged even if the cylinder 18 will retract a small distance, either due, for example, to the energization process of the collet 21 or due to thermal expansions in the various clutch components, etc.

To disengage the clutch 8, spool 35 is moved rightwards to the position shown in FIG. 1 connecting the inlet port 38 to the discharge port 37, pressurizing the chamber 27-b, and energizing the face seal 28. This causes collet 21 to be pushed leftwards by the piston 20 releasing the rod 23, which in turn allows the lever 14, which also functions as a return spring, to retract the cylinder 18 and the pressure plate 13 to their original unengaged position. After this took place, the spool 35 is returned to its neutral position venting chamber 27-b.

More descriptively the relation between the spool's (35) position and the clutch's (8) operation during a complete engagement and disengagement cycle could be summarized as follows:

a. The spool is centered (shown in FIGS. 1 and 2 in phanton line, and the clutch 8 is disengaged.
b. The spool is moved leftwards (as shown in FIG. 2) causing clutch engagement.
c. The spool is centered, the clutch remains engaged.
d. The spool 35 is moved rightwards (as shown in FIG. 1) causing the clutch 8 to disengage.
e. The spool 35 is centered, the clutch 8 remains disengaged.

Various of the features of the invention have been particularly shown and described, it should be obvious to one skilled in the art that various modifications may be made therein without departing from the scope of the invention.

It is claimed:
1. A clutch mechanism for coupling a first shaft to a second shaft including a clutch housing connected for rotation with said first shaft; a friction plate connected for rotation with said second shaft; a pressure plate operative to engage said friction plate with said clutch housing; fluid pressure activating means operatively associated with said pressure plate and including a first cylinder, a first piston and a first pressure chamber defined between said piston and cylinder, said piston and cylinder being operative when pressure fluid is introduced into said first pressure chamber to urge said pressure plate into its clutch engaged condition, mechanical wedging means associated with said first piston and said first cylinder and operative to retain said first piston and cylinder in a clutch engaged condition, and a second piston, a second cylinder and a second pressure chamber associated with said mechanical wedging means and operative when pressure fluid is introduced into said second chamber, to the exclusion of said first chamber, to condition said mechanical wedging means to allow said first piston and cylinder to assume a clutch disengaged position.

2. A clutch mechanism as in claim 1 wherein said first and second cylinders and said piston means are mechanically attached to said clutch housing, and wherein said first cylinder and piston means are pressurizable from a stationary fluid pressure supply while said clutch housing, said first cylinder and said piston means are rotating.

3. A clutch mechanism as in claim 2 wherein said second cylinder and said piston means are automatically pressurized upon pressurizing of said first cylinder and said piston means, also said second cylinder and said piston means are pressurizable without pressurizing said first cylinder of said piston means.

4. A clutch mechanism as in claim 1 wherein said fluid pressure activating means is associated with said pressure plate through a lever.

5. A clutch mechanism including a clutch housing connectable to a driving member; a friction plate connectable to a driven member and relatively rotatable with respect to said housing; a pressure plate operative to engage said friction plate with said clutch housing; a lever associated with said pressure plate for activation thereof; fluid pressure activating means associated with said lever including a first cylinder, a first piston and a first pressure chamber defined between said piston and cylinder such that said cylinder is operative when pressure fluid is introduced into said first chamber to act against said lever and urge said pressure plate into a clutch engaged condition, a collet contacting said first cylinder and adapted to retain said cylinder in a clutch engaged condition, a second piston, a second cylinder and a second pressure chamber defined between said piston and said cylinder; said second piston being operatively associated with said collet such that when pressure fluid is introduced into said second chamber to the exclusion of said first chamber said collet is conditioned to allow said second cylinder to assume a clutch disengaged position and resilient biasing means associated with said second piston to normally urge said piston and collet to a piston restraining position.

* * * * *